US011738238B2

(12) United States Patent
Mahata et al.

(10) Patent No.: US 11,738,238 B2
(45) Date of Patent: Aug. 29, 2023

(54) SYSTEM FOR REGULATING DEVICE CHARGE DEPENDING ON FITNESS METRICS

(71) Applicants: Simrik Mahata, Potomac, MD (US); Andrew Aloisio, Belmont, MA (US); Aroo Mahata, Potomac, MD (US); Brandon Law, Belmont, MA (US); Maia Redi, Belmont, MA (US); Mia Salazar, Belmont, MA (US); Quincy Crockett, Belmont, MA (US)

(72) Inventors: Simrik Mahata, Potomac, MD (US); Andrew Aloisio, Belmont, MA (US); Aroo Mahata, Potomac, MD (US); Brandon Law, Belmont, MA (US); Maia Redi, Belmont, MA (US); Mia Salazar, Belmont, MA (US); Quincy Crockett, Belmont, MA (US)

(*) Notice: Subject to any disclaimer, the term of this patent is extended or adjusted under 35 U.S.C. 154(b) by 192 days.

(21) Appl. No.: 17/236,920

(22) Filed: Apr. 21, 2021

(65) Prior Publication Data

US 2022/0339497 A1 Oct. 27, 2022

(51) Int. Cl.
*G06F 1/28* (2006.01)
*A63B 24/00* (2006.01)
*H02J 7/00* (2006.01)

(52) U.S. Cl.
CPC ...... *A63B 24/0062* (2013.01); *A63B 24/0087* (2013.01); *H02J 7/007* (2013.01); *H02J 7/00034* (2020.01); *A63B 2024/0068* (2013.01); *A63B 2024/0096* (2013.01)

(58) Field of Classification Search
None
See application file for complete search history.

(56) References Cited

U.S. PATENT DOCUMENTS

| 10,928,880 B2* | 2/2021 | Sultenfuss | G06F 1/266 |
| 2012/0316695 A1* | 12/2012 | Chen | H02J 3/14 |
| | | | 700/295 |
| 2015/0091507 A1* | 4/2015 | Hyde | B60L 53/37 |
| | | | 320/108 |
| 2018/0136708 A1* | 5/2018 | Jahagirdar | G06F 1/3206 |

* cited by examiner

*Primary Examiner* — Sunit Pandya

(57) ABSTRACT

This invention is used to control the duration of time it takes to charge any device, depending on how many units the user has taken out of their fitness goal. This invention connects to a fitness device such as a smart watch and retrieves the amount of units the user has completed. Being conditional on how many units the user has taken, the device will either charge at a normal pace or proportionally slower. For example, if the user's daily goal was 10,000 units and they completed 5,000 units, their device would charge half its normal pace. This invention charges the device more slowly by pausing the charges for periods of time.

10 Claims, 4 Drawing Sheets

Charge Cycle 120

SYSTEM FOR REGULATING DEVICE CHARGE DEPENDING ON FITNESS METRICS

BACKGROUND

Countless times problems occur since groups of people don't take the time to maintain fit. While many fitness devices such as various smart watches track different fitness activities, they don't necessarily motivate the user to get active. For example, Alice got a new smart watch. After a couple of weeks, she paid less attention to it. She spent more time on her phone, and less time getting active. After a while, she realized that she was very out of shape. Alice could use this invention to get active and work towards her goal (spend time on her phone). Our invention encourages the user to stay fit by controlling the duration of time it takes to charge any device depending on how many units the user has taken out of their fitness goal.

SUMMARY

This invention is a charging device which communicates with a fitness tracking device such as a smartwatch, smartphone or other wearable device and retrieves the percentage that the user has achieved of a given goal the user has set for themself. Once the invention accesses the fitness tracking device, it will need to find the correct data. Then, it will decode the data, if necessary, so the invention will be able to understand it. Once the data has been decoded, the invention finds the data for the specific unit and the data for the user's goal. The units can be any fitness unit such as steps, calories, minutes of exercise, etc. The user can also choose how much their goal is, for example, 10,000 steps, 2000 calories, 60 minutes exercise, etc. Once the invention finds all the data needed, it will store it for future reference. Being conditional on how many units the user has taken, the invention will either charge at a normal pace or proportionally slower depending on how many units the user has taken out of their goal. This invention charges the device more slowly by pausing the charges for periods of time. In other words, the invention delivers power at a certain percent of the time based on the realization of the set goals. Finally, the user will connect the invention to the fitness tracking device they are going to charge. If the goal has already been met, this invention will track how much the user has passed their goal. Depending on how much the user has surpassed their goal, an embodiment of the invention could track and add the extra amount to another day.

DETAILED DESCRIPTION

Figure 3:
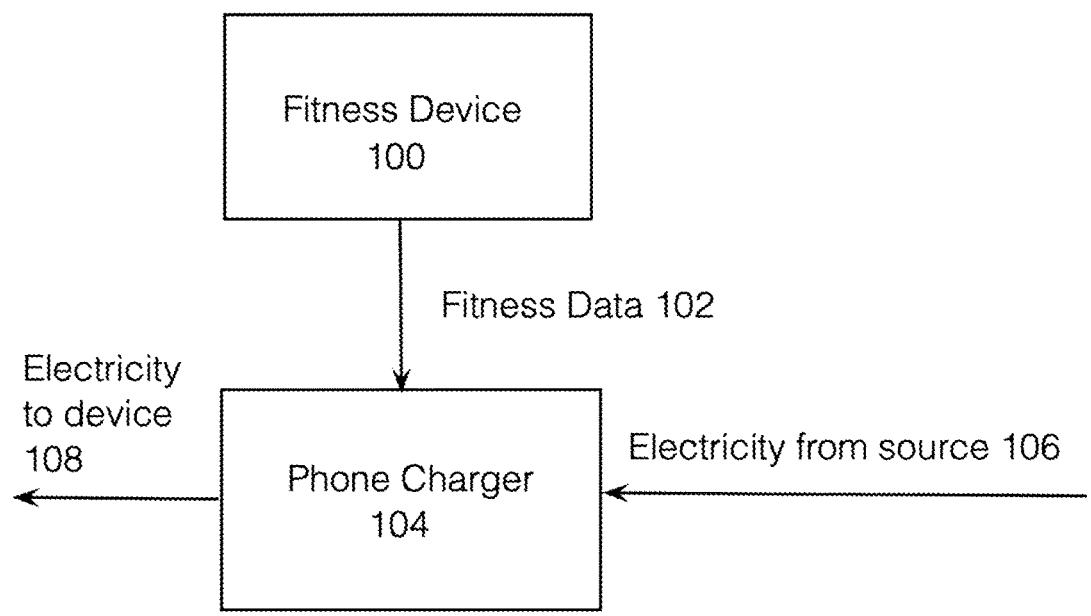
FIG. 3 is an image of how the invention connects to the other pieces used in the invention, like the charger and fitness device.
Figure 4:
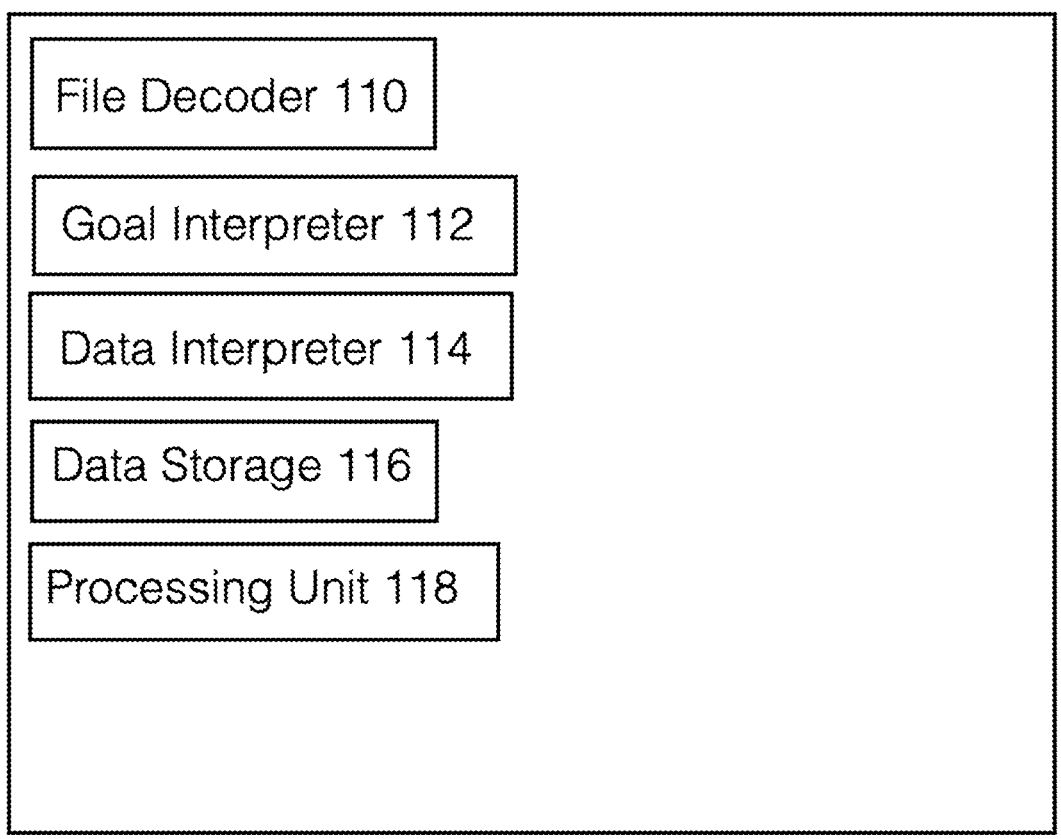
FIG. 4 is an image of the components required to implement the invention.

This invention comprises a device charger 104 which connects to a fitness device 100, retrieves fitness data 102 from the fitness device, takes in a power source 106 and delivers a charge 108 to a device conditional upon the fitness data. This is shown in FIG. 3.

Figure 1:
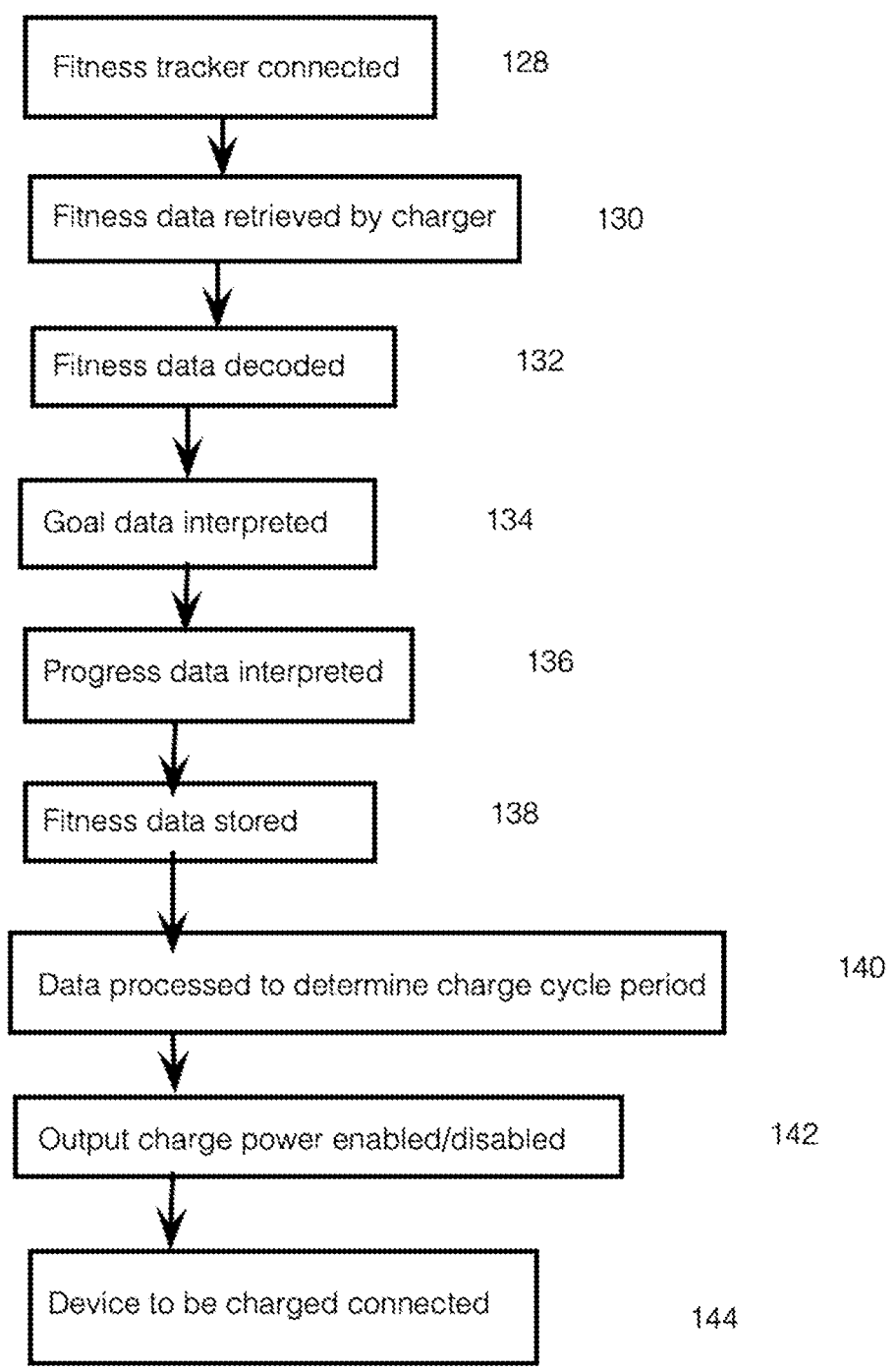
FIG. 1 is a depiction of a flowchart that demonstrates how the invention will work.

First, the device 100 is connected to the charging device 104 as shown in step 128 of FIG. 1. Examples of this type of connection could be USB, Bluetooth, etc.

Next, the fitness data 102 is retrieved from device 100, as shown in step 130. This data contains the numerical measurement and the numerical goal.

Next, if the fitness data 102 is encoded in a binary format, it will be decoded into a human readable format by file decoder 110 which is shown in step 132.

Next, the goal interpreter 112 parses through the fitness data 102 to find a numerical goal which is shown in step 134.

Next, the data interpreter 114 parses through the fitness data 102 to find a numerical progress measurement which is shown in step 136.

Next, the numerical progress measurement and numerical goal is stored in the data storage 116, which is shown in step 138.

Figure 2:
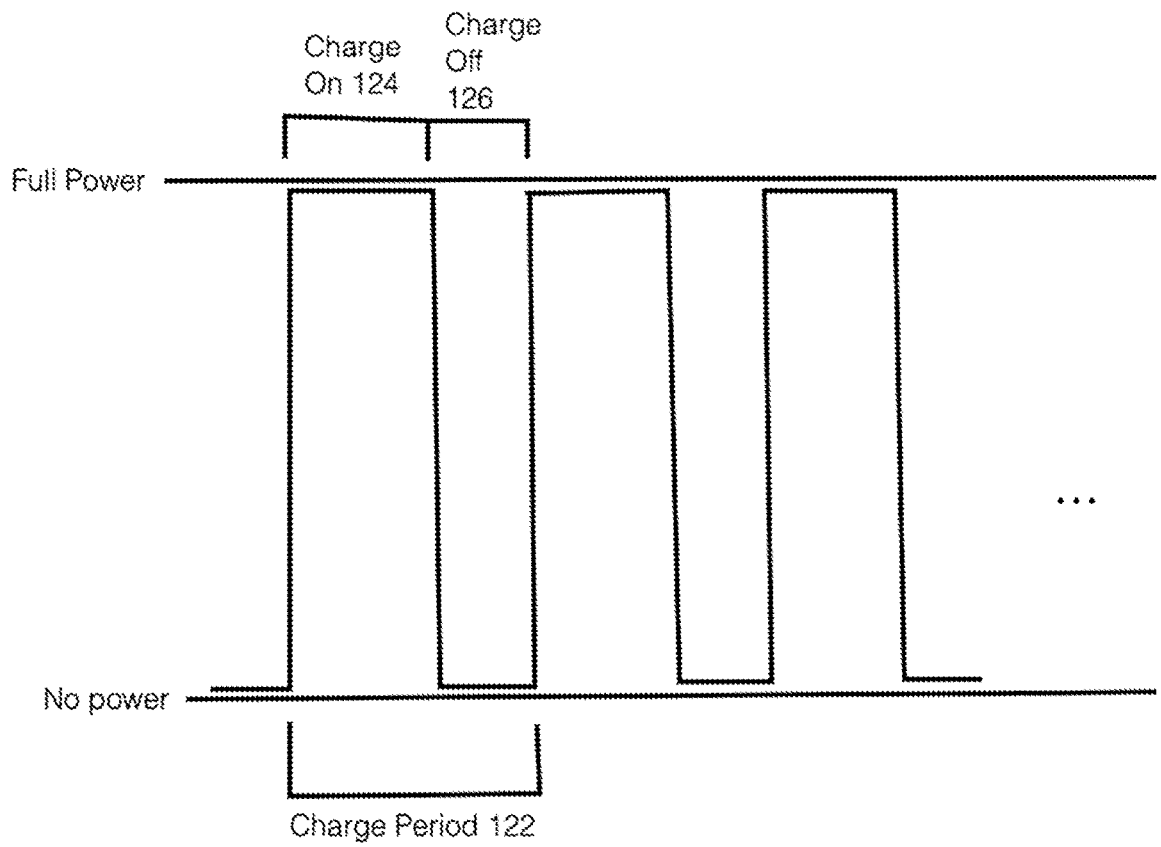
FIG. 2 is an illustration of the charging algorithm the invention uses.

Next, the numerical goal and numerical progress measurement is processed in the processing unit 118 to determine the charge cycle period 122 which is shown in step 140, and depicted in FIG. 2. The charge cycle has a charge-on duration 124 and charge-off duration 126. This charge period 122 repeats indefinitely but can change if the fitness data 102 changes.

Next, the output charge power is enabled or disabled according to charge cycle 120 which is shown in step 142.

Finally, the device that needs to be charged is connected which is shown in step 144.

In one embodiment a method for determining the charge rate of a specified device comprising the steps of: retrieving from a fitness tracking device data associated with a trackable fitness activity; comparing the data associated with a trackable fitness activity with a user input goal associated with the trackable fitness activity; calculating a charge rate based on the comparison step; and sending to the specified device the determined charge rate, wherein the specified device when charging will only charge at the determined charge rate.

It should be noted that the specified device to be charged could be a smartphone, smartwatch or other wearable device. The fitness tracking device could include smartphone, smartwatch or other wearable device configured to track at least one activity set of data. In other words, one device could be the device to track the fitness activity data and be the same device where the charge rate is limited thereon or they could be different devices. The device to be charged could even include tablets, game consoles, and other rechargeable electronic devices.

The charge rate can be an hourly, daily, or even weekly charge rate that resets according to the same period and based on the whether the goals for the given period have been achieved. The charge rate can be preset for the next period based on the results of the previous periods goals or percentage of achievement.

In some variations, if the trackable fitness activity for a period of time exceeded the user input goal for the same period of time, the system and method could calculate a carryover amount to be applied to a future period of time.

As noted, the charge rate could be a percentage of the normal charging rate for a given period of time. It should also be separated into blocks, quintiles or other fractions. For example, if the user achieved between 81-100 percent of their goal, the charge rate could be 80. If they achieved between 61-80 percent the charge rate could be 60 percent.

Alternatively, the percentage of the charge rate could be commensurate with a percentage of completion of the user input goal compared to the trackable fitness activity data. For example, if the user completed 63 percent of their goal the charge rate could be set to 63 percent.

The charge rate could also default to a lower rate, such as 20 percent until the comparison step and data are gathered to confirm the true percentage of the goal being met.

It should be noted that although certain examples have been described and conveyed above that one skilled in the art would appreciate additional embodiments and implementations that are commensurate with the scope of the invention. For example, there could be alternative means to acquire the data via various sensors that are known in the art, and how the data is interpreted, compared and stored could also vary. This could include processing on the smartphone, fitness activity device, or even via a cloud-computing system. Thus, the examples provided should not be interpreted to be limiting.

The invention claimed is:

1. A computer implemented method comprising: accessing data on a device which contains a numerical measurement indicating user physical activity and an associated numerical goal wherein the data is accessed from a fitness device;
   decoding the data from a binary format into a human readable format if necessary;
   parsing the decoded data to identify the numerical measurement and numerical goal;
   determining a device charge rate percentage P by dividing the numerical measurement by the numerical goal;
   calculating a charge cycle duration, wherein the charge cycle duration contains a power-on time at full charge followed by a power-off time at zero charge, where the power-on time has a duration D and the power-off time has a duration equal to D(1−P)/P, which results in charge being delivered at rate P based on per day fitness goals predetermined by the user;
   and delivering charge, based on the determined charge rate, by repeating the charge cycle.

2. The computer implemented method according to claim 1, wherein the numerical measurement and numerical goal are stored in a local data store.

3. The computer implemented method according to claim 1, wherein an input from the device containing the data and the numerical measurement and numerical goal; an input from power source; and an output source which is on or off according to the charge cycle.

4. A method for determining the charge rate of a specified device comprising the steps of:
   retrieving from a fitness tracking device data associated with a trackable fitness activity;
   comparing the data associated with a trackable fitness activity with a user determined input goal associated with the trackable fitness activity;
   calculating a charge rate P based on the comparison step by dividing the data by the goal;
   sending to the specified device the determined charge rate, wherein the specified device when charging will only charge at the determined charge rate, via a charge cycle which comprises a power-on time at full charge followed by a power-off time at zero charge, where the power-on time has a duration D and the power-off time has a duration equal to D(1−P)/P, which results in charge being received at rate P;
   and receiving charge by repeating the charge cycle, based on determined charge rate.

5. The method for determining the charge rate of a specified device of claim 4, wherein the specified device is a smartphone.

6. The method for determining the charge rate of a specified device of claim 5, wherein the fitness tracking device is a smartwatch configured to track at least one activity set of data.

7. The method for determining the charge rate of a specified device of claim 6, wherein the charge rate is a daily charge rate that resets each day.

8. The method for determining the charge rate of a specified device of claim 7, further comprising the step of determining if the trackable fitness activity for a period of time exceeded the user input goal for the same period of time and calculating a carryover amount to be applied to a future period of time.

9. The method for determining the charge rate of a specified device of claim 4, wherein the charge rate is a percentage of the normal charging rate for a given period of time.

10. The method for determining the charge rate of a specified device of claim 9, wherein the percentage of the charge rate is commensurate with a percentage of completion of the user input goal compared to the trackable fitness activity data.

* * * * *